US007639640B2

United States Patent
Fujii et al.

(10) Patent No.: US 7,639,640 B2
(45) Date of Patent: Dec. 29, 2009

(54) NETWORK SECURITY SYSTEM, COMPUTER, ACCESS POINT RECOGNIZING METHOD, ACCESS POINT CHECKING METHOD, PROGRAM, STORAGE MEDIUM, AND WIRELESS LAN DEVICE

(75) Inventors: Kazuo Fujii, Yokohama (JP); Masaharu Itoh, Yamato (JP); Kozo Matsunaga, Sagamihara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1463 days.

(21) Appl. No.: 10/248,116

(22) Filed: Dec. 19, 2002

(65) Prior Publication Data
US 2003/0117985 A1    Jun. 26, 2003

(30) Foreign Application Priority Data
Dec. 26, 2001    (JP)    ............... 2001-395303

(51) Int. Cl.
*H04W 4/00*    (2009.01)
*H04L 12/28*    (2006.01)

(52) U.S. Cl. ................ 370/328; 370/338; 370/401; 455/432.1; 455/435.1

(58) Field of Classification Search ............. 370/329, 370/331, 254, 235, 229, 328, 338, 401; 455/432.1, 455/435.1
See application file for complete search history.

(56) References Cited

U.S. PATENT DOCUMENTS

| 5,461,627 A | * | 10/1995 | Rypinski ............. 370/346 |
| 5,724,346 A | * | 3/1998 | Kobayashi et al. ........ 370/329 |
| 5,933,420 A | * | 8/1999 | Jaszewski et al. ......... 370/329 |
| 6,201,962 B1 | * | 3/2001 | Sturniolo et al. ........ 455/432.2 |
| 6,259,898 B1 | * | 7/2001 | Lewis ............... 455/103 |
| 6,393,261 B1 | * | 5/2002 | Lewis ............... 455/103 |
| 6,810,018 B2 | * | 10/2004 | Paranchych et al. ....... 370/252 |
| 6,877,104 B1 | * | 4/2005 | Shimono ............. 714/4 |
| 6,892,052 B2 | * | 5/2005 | Kotola et al. ........... 455/41.2 |
| 6,917,804 B2 | * | 7/2005 | Takayama et al. ........ 455/432.1 |
| 6,957,067 B1 | * | 10/2005 | Iyer et al. ............ 455/435.1 |
| 6,990,343 B2 | * | 1/2006 | Lefkowitz ............ 455/436 |
| 7,170,857 B2 | * | 1/2007 | Stephens et al. ......... 370/230 |
| 7,197,306 B1 | * | 3/2007 | Song ............... 455/436 |
| 2004/0033812 A1 | * | 2/2004 | Matsunaga et al. ........ 455/557 |

FOREIGN PATENT DOCUMENTS

| JP | 11-355315 | 12/1999 |
| JP | 2001-258058 | 9/2001 |

* cited by examiner

*Primary Examiner*—Alpus H Hsu
(74) *Attorney, Agent, or Firm*—Patrick J. Daugherty; Driggs, Hogg, Daugherty & Del Zoppo Co., LPA

(57) ABSTRACT

In a network security system, clients search for neighbor access points (APs) in order to establish wireless connections to a LAN. As a result of the search, each of the clients dispatches a list of access points obtained to a controller. The controller detects non-registered access points by comparing a list of previously registered access points with the lists dispatched by the clients.

7 Claims, 7 Drawing Sheets

| COLLECTED AP LIST | A, B, C, D |
| --- | --- |
| REGISTERED AP LIST | A, B, D |

NETWORK SECURITY SYSTEM, COMPUTER, ACCESS POINT RECOGNIZING METHOD, ACCESS POINT CHECKING METHOD, PROGRAM, STORAGE MEDIUM, AND WIRELESS LAN DEVICE

BACKGROUND OF THE INVENTION

The present invention relates to a network security system or the like, and in particular, to a network security system or the like which can detect illegally connected access points.

Computers are widely used in various sites such as offices and homes. Computers generally used include desk top type PCs (Personal Computers) substantially fixed to a predetermined place such as a desk, notebook type PCs designed to be relatively small for portability, and PDAs (Personal Digital Assistants). These computers transmit and receive data to and from external equipment through the network. In particular, in recent years, data are transmitted and received by radio using wireless LAN modules. Introduction of a wireless LAN module allows a user to easily transmit and receive data to and from external equipment even when the user is out of his or her office or home, as long as the computer can transmit and receive data to and from wireless base stations (hereinafter referred to as "access points") connected to the network.

In data transmissions to and from access points, computers not permitted to connect to the network illegally connect to the network to steal data. Thus, various processes have been executed in order to prevent such illegal connections to the network. For example, with an approach called "WEP (Wired Equivalent Privacy), data is encrypted on the basis of a 64- or 128-bit key to check for errors or alterations in order to prevent illegal connections. However, with the WEP, if the key is illegally obtained, the encrypted data is easily decrypted. On the other hand, an approach called "MAC (Media Access Control) Address Filtering" inhibits accesses by computers having MAC addresses other than those of computers permitted beforehand to access the network. However, MAC addresses can be forged relatively easily. Accordingly, it is difficult to provide a function of completely preventing illegal accesses by computers that are not permitted.

Thus, a method of incorporating a plurality of approaches has recently been employed. For example, user IDs and passwords are used to manage connections attempted by predetermined users, the MAC (Media Access Control) Address Filtering is used to manage connections attempted by predetermined computers, and an approach called "802.1x" is used to encrypt data. With the 802.1x, for each session between a computer and an access point, the above WEP key is dynamically generated and used for authentication. That is, with this method, a different key is used for each session. Accordingly, even if the key is stolen, it is invalid for the next session.

However, the above method may be invalid if an illegal access point is connected to the network. In general, the WEP key is saved to a memory of a computer or access point, and is authenticated uni-directionally by the access point. Thus, the access point authenticates a user using the computer, but it is impossible for the user to authenticate the access point. Consequently, if an access point is illegally installed, data may be illegally obtained through it or an illegal user's client may be taken over.

Further, the WEP key may be bidirectionally authenticated, i.e. the computer and the access point may authenticate each other. However, in this case, an authentication server different from a server or a client must be installed on the network. Further, much time and labor is required to set the authentication and to manage illegal accesses.

The present invention is based on the above technical problems. It is a main purpose of the present invention to provide a network security system or the like which can enhance security in a network for wireless communication.

BRIEF SUMMARY OF THE INVENTION

To attain the above purpose, a network security system according to the present invention is characterized by including a client permitted to establish a wireless connection to a network through an access point, and a controller permitted to receive data dispatched by the client, through the network, and in that the client scans electromagnetic waves within frequency bands permitted to be used for wireless communication, and dispatches to the controller identification information on access points detected as a result of the scan, and in that the controller stores the identification information on access points permitted to access the network, and on the basis of the identification information on the permitted access points and the identification information dispatched by the client, extracts non-registered access points that are not registered as permitted access points. This network security system can locate access points that are not registered by comparing previously permitted access points with access points detected by the client.

With this network security system, the client can dispatch to the controller the identification information on the access points not used for the wireless connection.

Further, the client can dispatch to the controller the intensities of signals received from the access points, and on the basis of the intensities, can estimate areas in which the non-registered access points are installed.

Furthermore, the present invention can be implemented as a computer. This computer is permitted to communicate wirelessly with an access point connected to a network, and is characterized by including a recognizing section that recognizes identification information on access points on the basis of electromagnetic waves generated by the access points, a storage section that stores the identification information recognized by the recognizing section, and a dispatching section that dispatches through the network the identification information stored in the storage section.

In this case, the dispatching section can dispatch identification information every predetermined time or in response to a request transmitted via the network.

Furthermore, a computer according to the present invention is permitted to transmit and receive data via a network to and from a client permitted to be wirelessly connected to the network via an access point, and is characterized by including a storage section storing a permission list of permitted access points permitted to access the network, a collecting section that collects a recognition list of recognized access points recognized by the client scanning electromagnetic waves within bands permitted to be used for wireless communication, and an extracting section that extracts those non-registered access points of the recognized access points included in the recognition list which are not included in the permission list on the basis of the permission list and the recognition list.

This computer may further includes an installed position information storage section that stores installed position information on the permitted access points in the network, a signal collecting section that collects the intensities of signals generated by the recognized access points, and a calculating section that calculates positions at which the non-registered access points are installed, on the basis of the intensities and the installed position information.

Moreover, the present invention may be implemented as an access point recognizing method. This access point recognizing method is executed by a computer permitted to communicate wirelessly with access points connected to a network, and is characterized by including the steps of scanning electromagnetic waves within bands permitted to be used for wireless communication, obtaining a list of access points detected by the scan, dispatching the list obtained, through the network, obtaining the intensities of signals generated by the access points, and dispatching the intensities through the network.

Further, The present invention may be implemented as an access point checking method. This is a method of checking an access point connected to a network in order to connect a computer to the network by radio, and is characterized by including the steps of obtaining a permission list of access points permitted to access the network, obtaining a detection list of access points recognized by the computer, comparing the permission list with the detection list to recognize those non-registered access points of the access points included in the detection list which are not included in the permission list, registering positions at which the access points included in the permission list are installed, obtaining the intensities of signals from the access points detected by scan carried out by the computer, and calculating positions at which the non-registered access points are installed, on the basis of the intensities.

Furthermore, the present invention may be implemented as a program executed by a computer. This program is executed by a computer permitted to communicate wirelessly with access points connected to a network, and is characterized by including a procedure of scanning electromagnetic waves within bands permitted to be used for wireless communication, a procedure of recording a list of access points detected by the scan, a procedure of dispatching the list through the network, a procedure of obtaining the intensities of vibration occurring at the access points, and a procedure of dispatching the intensities through the network.

The present invention also provides a program for checking an access point connected to a network in order to connect a computer to the network by radio, the method being characterized by including a procedure of obtaining a permission list of access points permitted to access the network, a procedure of obtaining a detection list of access points recognized by the computer, a procedure of comparing the permission list with the detection list to recognize those non-registered access points of the access points included in the detection list which are not included in the permission list, a procedure of registering positions at which the access points included in the permission list are installed, a procedure of obtaining the intensities of signals from the access points detected by scan carried out by the computer, and a procedure of calculating positions at which the non-registered access points are installed, on the basis of the intensities.

The present invention may also provide a storage medium storing a program and a wireless LAN device that can be connected to a computer.

BRIEF DESCRIPTION OF THE SEVERAL
VIEWS OF THE DRAWINGS

Some of the purposes of the invention having been stated, others will appear as the description proceeds, when taken in connection with the accompanying drawings, in which.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
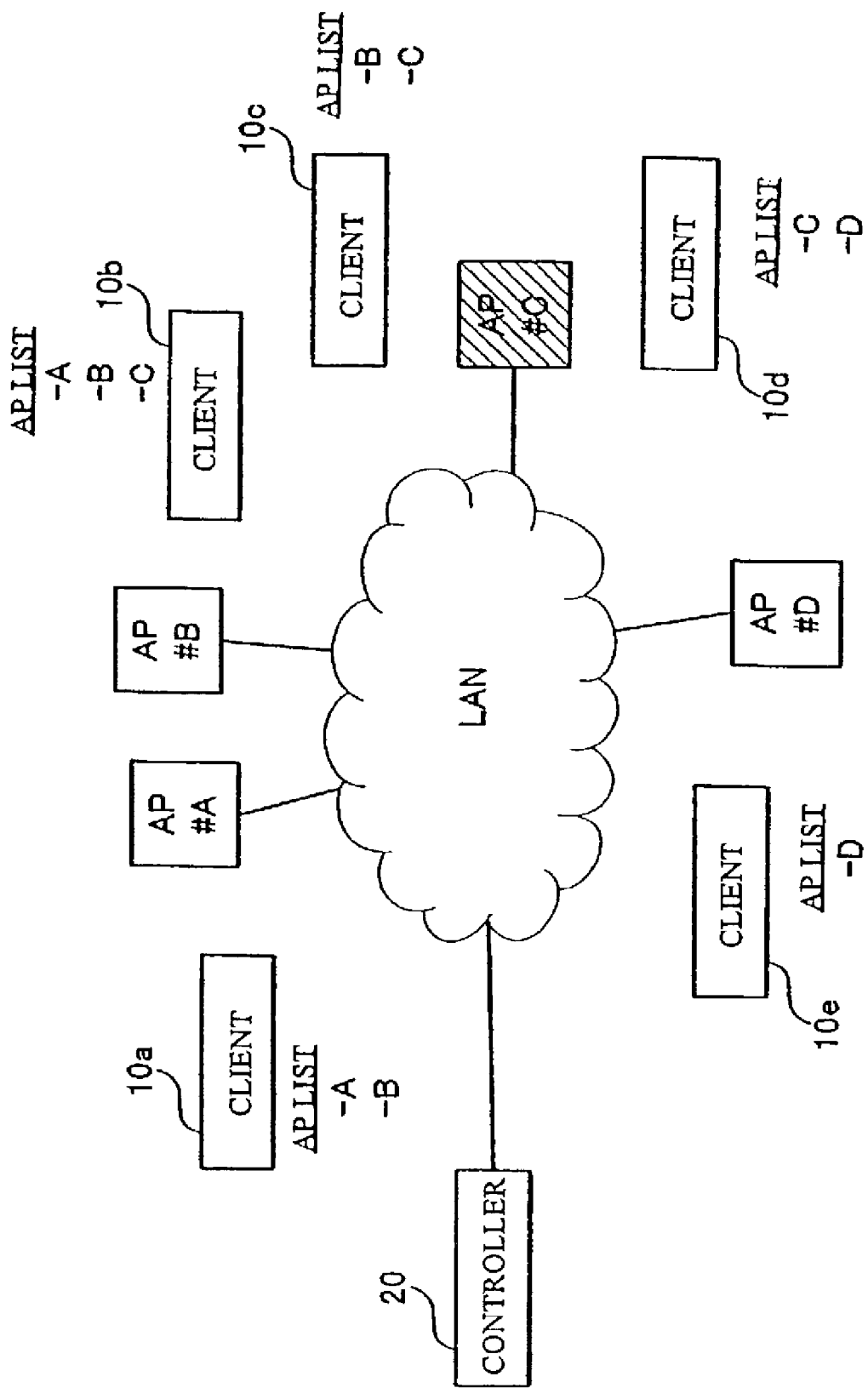
FIG. 1 is a diagram illustrating a configuration of a LAN system according to this embodiment.

FIG. 1 is a diagram illustrating a configuration of a LAN (Local Area Network) system (Network Security System) that uses wireless communication according to this embodiment. The LAN system shown in FIG. 1 comprises clients (computers) 10a, 10b, 10c, 10d, 10e (hereinafter sometimes simply referred to as 10a to 10e or 10a, 10e) as users' terminals, a controller (computer) 20 as a terminal used by a system administrator, and access points (hereinafter referred to as "APs") AP#A, AP#B, AP#C, and AP#D (hereinafter sometimes simply referred to as AP#A to AP#D). The clients 10a to 10e can be connected to a network via the access points AP#A to AP#D. Further, the controller 20 is connected to the network by wire. However, the controller 20 may also be connected to the network via the access points AP#A to AP#D.

Figure 2:
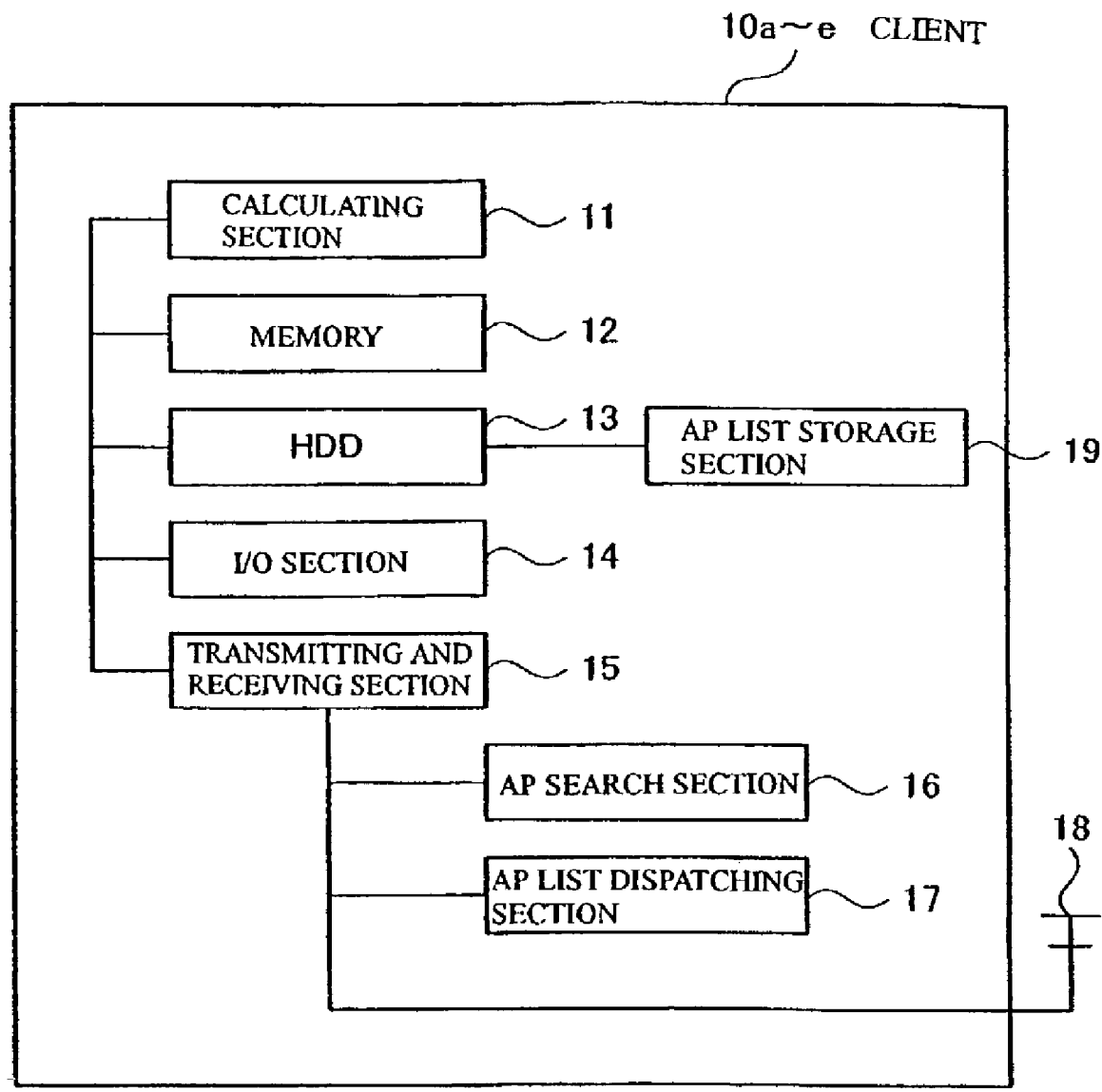
FIG. 2 is a diagram showing a configuration of a client.

Each of the clients 10a to 10e, shown in FIG. 2, comprises an calculating section (recognizing section) 11 such as a CPU, a memory 12, an HDD (Hard Disk Drive, a storage section) 13, an I/O section 14 that receives inputs from users and outputs data to the users, and a transmitting and receiving section (recognizing section) 115 that transmits and receives data to and from external equipment via the network. Furthermore, the transmitting and receiving section 15 comprises an AP search section 16 having a function of searching for APs, an AP list dispatching section 17 having a function of dispatching an AP list obtained to a controller 20, and an antenna 18. Further, the HDD 13 comprises an AP list storage section 19 to which the AP list obtained is saved.

Although not shown, the transmitting and receiving section 15 of each of the clients 10a to 10e comprises a power amplifier in communication with an antenna 18, an RF/IF converter synthesizer, an I/Q modulator demodulator, a baseband processor, a media access controller that controls transmission and reception of electromagnetic waves, or the like. These clients are LAN cards or boards complying with, for example, the IEEE 802.11 standards and using, for example, an electromagnetic wave in a 2.4-GHz band, an electromagnetic wave in a 5-GHz band, or infrared rays.

Figure 3:
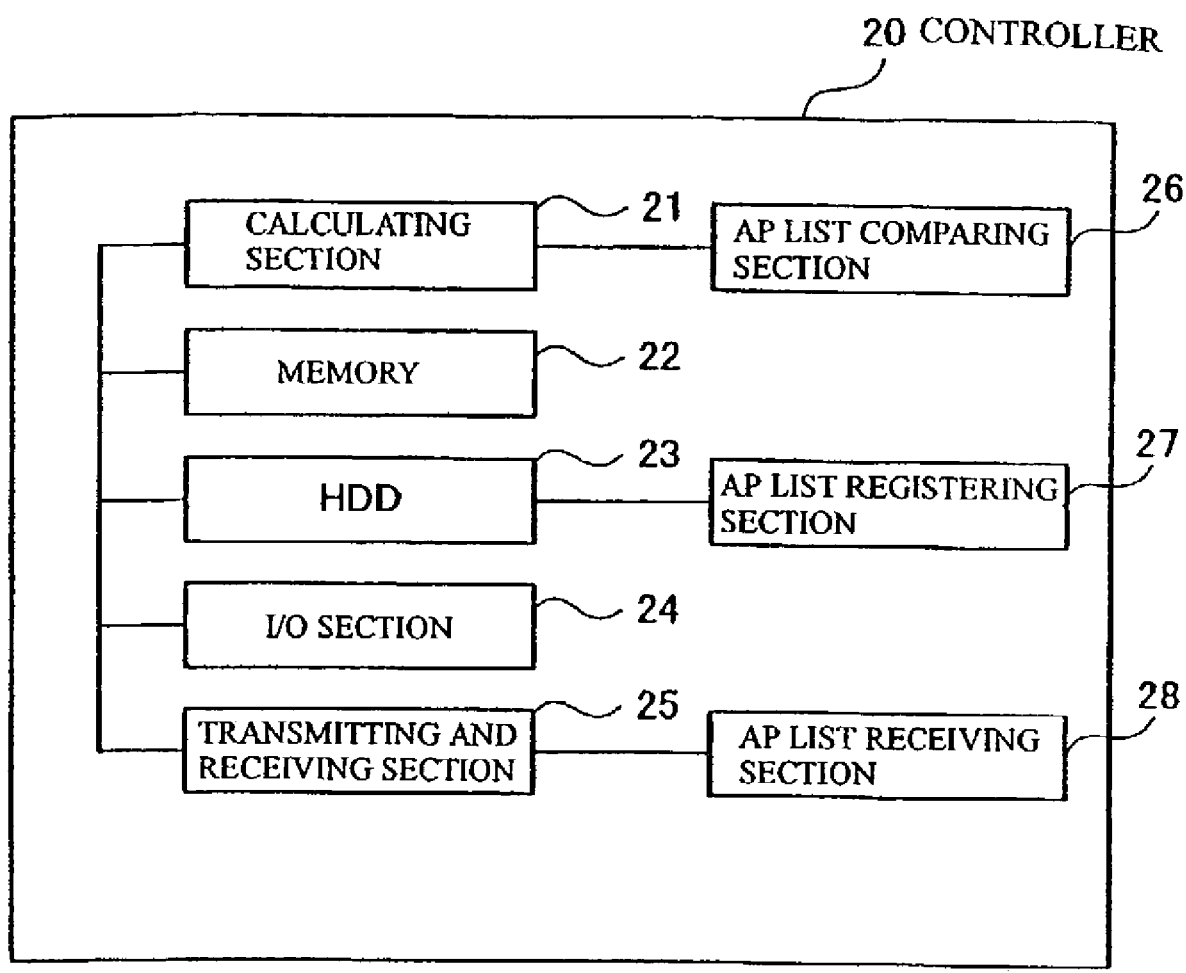
FIG. 3 is a diagram showing a configuration of a controller.

The controller 20, shown in FIG. 3, comprises a calculating section 21 such as a CPU, a memory 22, an HDD 23, an I/O section 24 that receives inputs from users and outputs data to the users, and a transmitting and receiving section 25 that transmits and receives data to and from external equipment via the network. Furthermore, the calculating section 21 comprises an AP list comparing section (extracting section) 26 having a function of comparing an AP list obtained with a registered AP list. Further, the HDD 23 comprises an AP list registering section (storage section) 27 in which a list of APs permitted to connect to the network are. The transmitting and receiving section 25 comprises an AP list receiving section (collecting section) 28 having a function of receiving the AP list dispatched by each of the clients 10a to 10e.

The clients 10a to 10e and the controller 20 are users' computers, e.g. notebook type PCs (Personal Computers), desk top type PCs, or PDAs, and may have other members incorporated in these computers. The clients 10a to 10e and the controller may be the same computer or different computers.

Typically, to transmit and receive data to and from external equipment through a wireless LAN, the transmitting and receiving section 15 of each of the clients 10a to 10e periodically retrieves APs in order to reliably achieve data transmissions and receptions. In retrieving the APs, the client 10a, . . . , 10e first uses an electromagnetic wave of a predetermined frequency to carry out scan to locate an AP with which it can establish communication. Then, after this AP and the client 10a, . . . , 10e have confirmed that they can transmit and receive data to and from each other, they start transmitting or receiving data to or from each other. On the basis of information on the retrieved APs, the LAN system according to this embodiment can detect that illegal APs are present within the network. Specific description will be given below of a method of detecting illegal APs.

Figure 4:
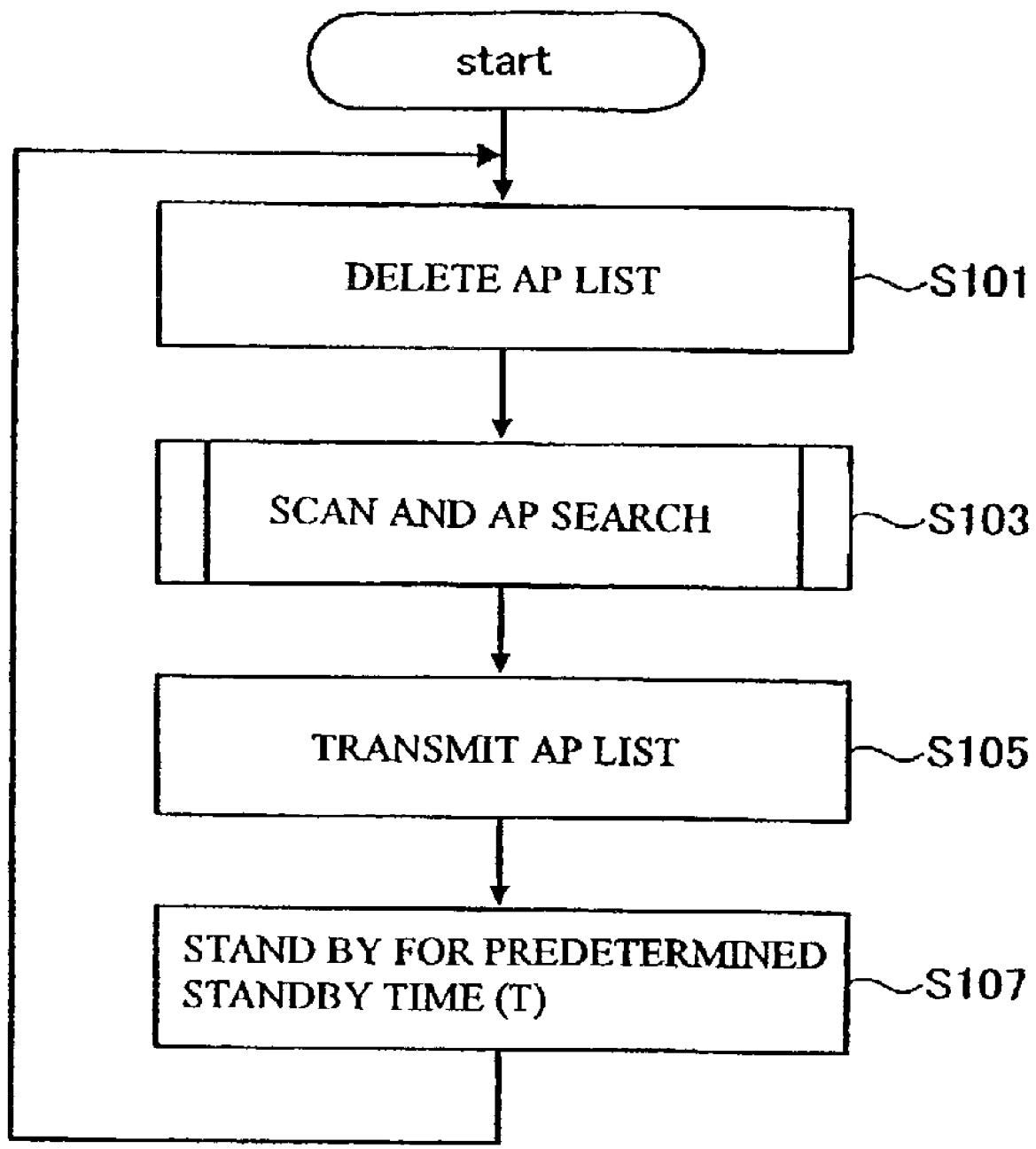
FIG. 4 is a flow chart showing a flow of a process executed by the client.

FIG. 4 shows a flow of a process executed by the clients 10a to 10e. This process is executed by the clients 10a to 10e carrying out a computer program installed in them. The clients 10a to 10e execute the process on the basis of the same program. Accordingly, the client 10a will be described by way of example.

First, an AP list (previously obtained by searching for APs) stored in the AP list storage section 19 of the HDD 13 is deleted (step S101). Subsequently, electromagnetic waves are scanned in order to search for APs to which the client can be connected, i.e. to search for and locate APs that can allow electromagnetic waves to reach the client 10a (step S103). Here, an AP scan and search operation will be described in detail.

Figure 5:
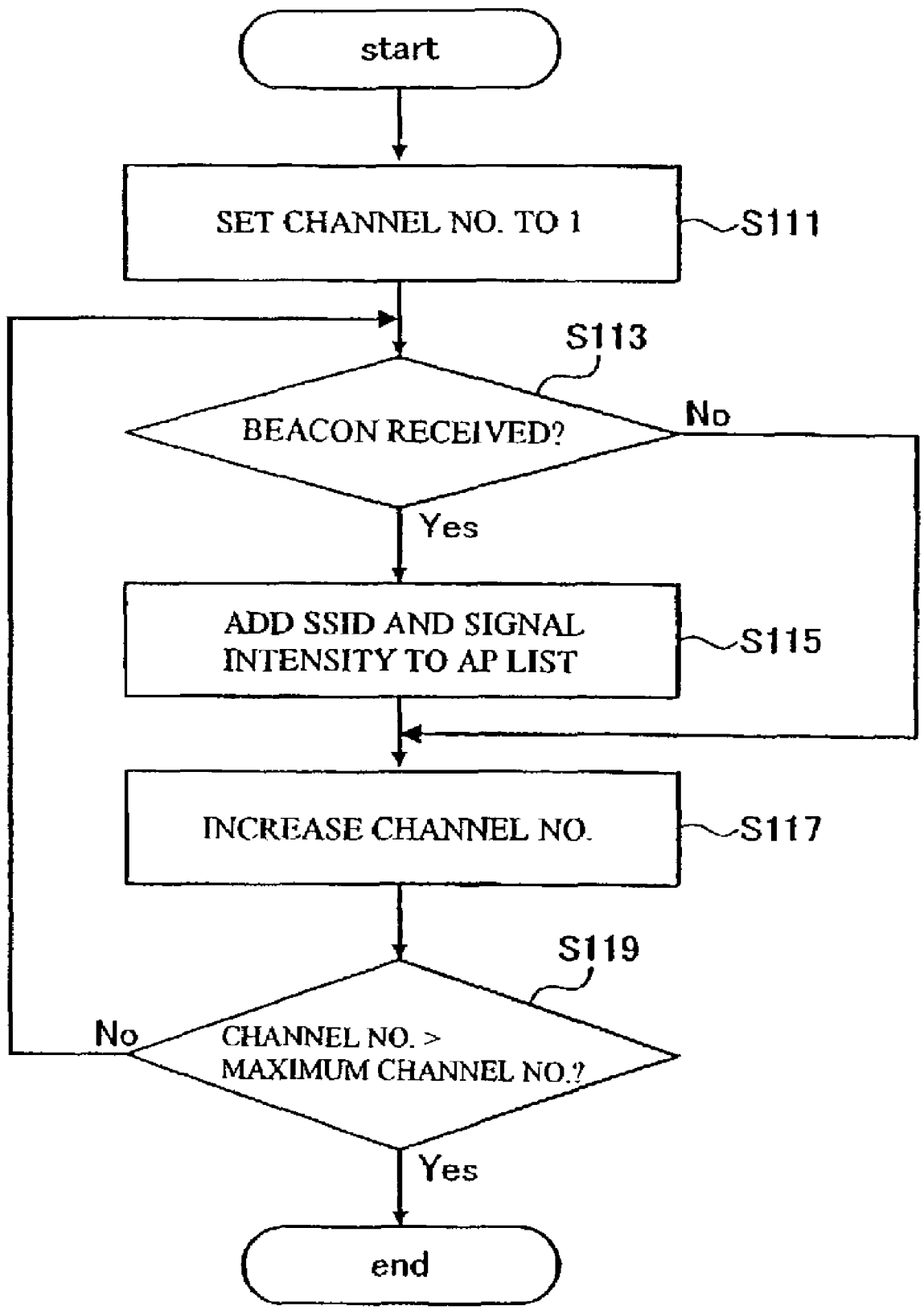
FIG. 5 is a flow chart illustrating a scan and AP search process executed by an AP search section of the client.

FIG. 5 is a flow chart showing a flow of a process executed for a scan and AP search operation by the AP search section 16 of the transmitting and receiving section 15. First, a channel number (hereinafter referred to as a "channel No.") for an electromagnetic wave is set to one (step S111). During this setting, the client 10a determines whether or not a beacon has been able to be received via the antenna 18 (step S113). If the client 10a determines that no beacons have been able to be received, it executes processing in step S117, described later. On the other hand, if the client 10a determines that a beacon has been received, an SSID (Service Set Identification) as an ID number identifying equipment with which the client is to communicate and the signal intensity of the beacon are added to the AP list in the AP list storage section 19 (step S115). For example, for the client 10a, as shown in FIG. 1, APs located near the client 10a, i.e. AP#A and AP#B are stored in the SP list storage section 19.

Subsequently, the channel No. for the electromagnetic wave to be scanned is increased (step S117). Then, it is determined whether or not the resulting channel No. is larger than the maximum channel No. that can be received by the transmitting and receiving section 15 (step S119). If it is determined that the channel No. is not larger than the maximum channel No., the procedure returns to step S113 to execute a similar process. On the other hand, if it is determined that the channel No. is larger than the maximum channel No., the scan and AP search process is ended.

The AP list dispatching section 17 of the transmitting and receiving section 15 dispatches the AP list thus obtained to the controller 20 as shown in FIG. 4 (step S105). Then, the procedure waits for a predetermined standby time (t) to pass (step S107). Once the standby operation is completed, the procedure returns to step S101 to start the process.

In this manner, during the scan and AP search process, the clients 10a to 10e receive information on the channels of APs from which they can receive electromagnetic waves, i.e. APs that it can recognize and on the intensities of signals from these APs. Then, each of the clients 10a to 10e obtains an AP list as shown in FIG. 1.

Figure 6:
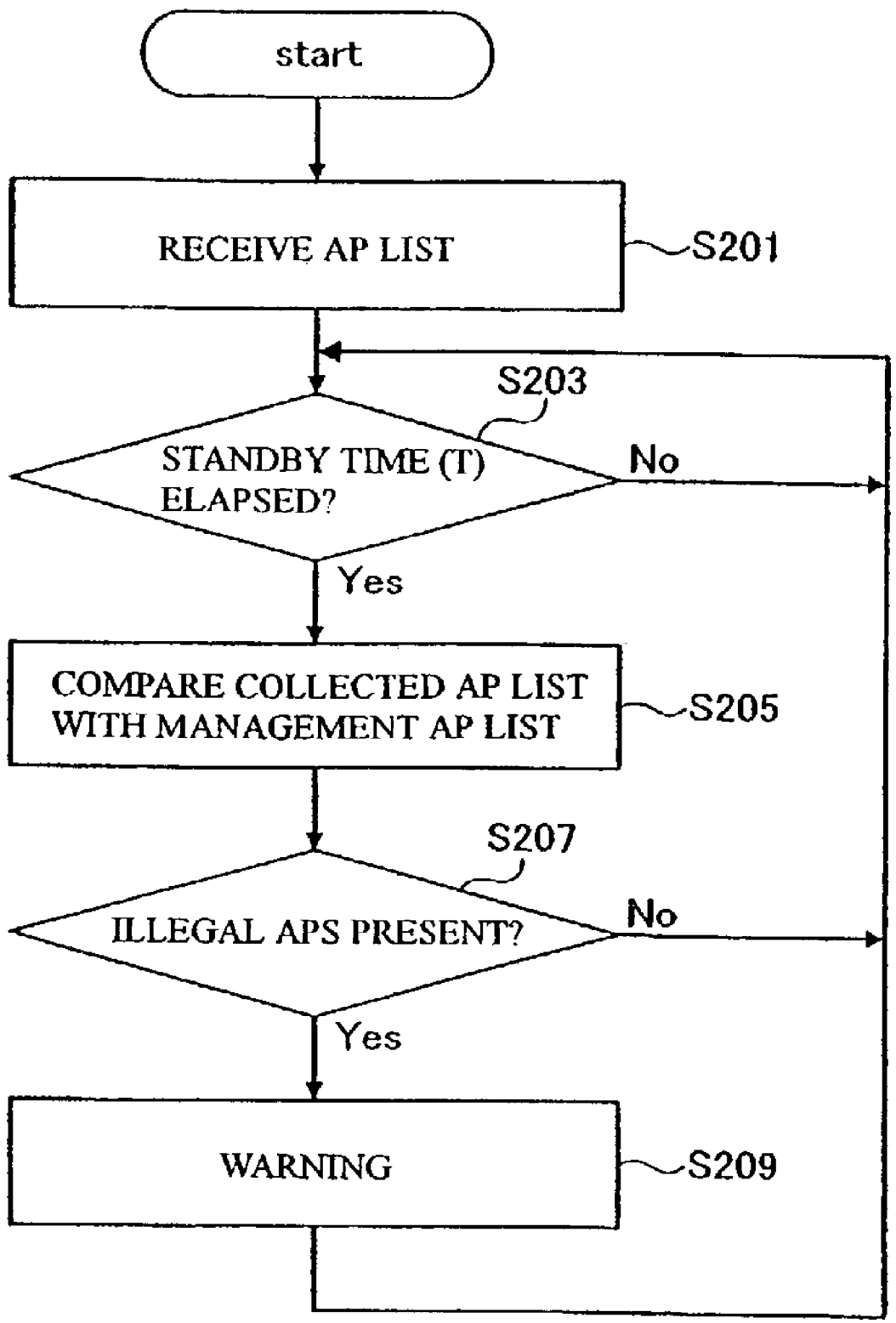
FIG. 6 is a flow chart illustrating a flow of a process executed by the controller.

FIG. 6 is a flow chart useful in describing a flow of a process executed by the controller 20. In this case, the controller 20 executes the process on the basis of a computer program installed in the controller 20. First, the AP list receiving section 28 of the transmitting and receiving section 25 receives AP lists transmitted by the clients 10a to 10e (step S201). The received lists are temporarily stored in the memory 22. Then, it is determined whether or not the standby time (t) has passed (step S203). The standby time (t) is used in order to receive AP lists, which are temporally randomly transmitted by any of the plurality of clients 10a to 10e, from as many clients 10a to 10e as possible. The standby time (t) may be set to be, for example, one hour. At step S203, if it is determined that the standby time (t) has not passed, the processing in step S203 is carried out again.

On the other hand, if it is determined at step S203 that the standby time (t) has passed, the AP list comparing section 26 compares a collected AP list as a collection of the received AP lists with the management AP list registered in the AP list registering section 27 of the HDD 23 (step S205). The management AP list contains genuine access points permitted to access the network. The access points in the management AP list are already confirmed to match the access points connected to the network. The management AP list is created, for example, by the system administrator. Further, the genuine access points may have been requested by the clients 10a to 10e or the like to be authenticated and have then been authenticated by the system administrator.

Figures 7A, 7B:
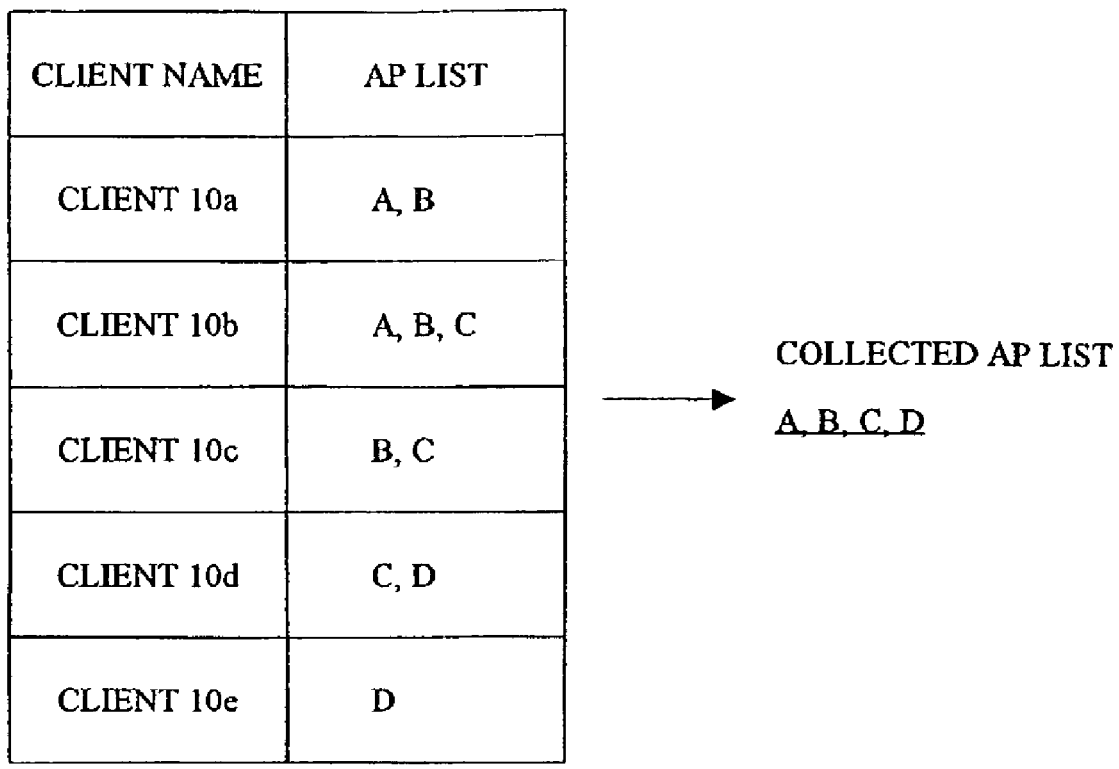
FIG. 7A is a diagram showing an example of AP lists received from clients 10a to 10e.
FIG. 7B is a diagram showing an example of data on a collected AP list and a management AP list registered in an AP list registering section.

FIG. 7A shows an example of AP lists received from the clients 10a to 10e. FIG. 7B shows an example of data in a collected AP list and a management AP list registered in the AP list registering section 27. As shown in FIG. 7A, data on APs actually connected to the network is obtained, as a collected AP list, from the AP lists collected from the clients 10a to 10e. Then, the collected AP list is compared with the registered AP list to extract those APs in the collected AP lists which are not registered in the registered AP list, i.e. illegal APs. In FIG. 7B, the AP#C is extracted as a non-registered AP.

Subsequently, on the basis of a process of detecting illegal APs, it is determined whether or not there are any illegal APs (step S207). If it is determined that there are no illegal APs, the procedure returns to step S201 to continue the process. If it is determined that there is an illegal AP, a warning is issued to the user of the controller 20 via the I/O section 24 (step S209). Subsequently, the procedure returns to step S201 to continue the process.

Here, the warning in step S209 may indicate the presence of an illegal AP and the estimated location of the illegal AP. For example, a diagram indicating the locations at which regularly registered APs that can be connected to the network are installed is recorded in the HDD 23 of the controller 20. Further, the AP lists received from the clients 10a to 10e contain the intensities of signals from the APs. This allows each of the clients 10a to 10e to determine how far it is from the location at which each regular AP is installed and to determine the rough location of the illegal AP on the basis of the intensity of a signal from the illegal AP recognized by the client. By thus obtaining the warning and the positional information on the illegal AP via the controller 20, the illegal AP can be located on the basis of this information and then removed.

As described above, in this embodiment, the clients 10a to 10e connected to the wireless LAN network dispatches data on APs the can be recognized by the clients 10a to 10e. Then, illegal APs can be easily detected by comparing the APs contained in the list of the recognized APs with previously registered APs. In the conventional wireless LAN network, the clients 10a to 10e perform search operations to recognize available APs, i.e. to recognize APs that can allow electromagnetic waves to reach the clients 10a to 10e. However, the process is ended once APs to and from which the clients transmit and received data have been identified. Thus, in this embodiment, illegal APs can be easily and reliably detected by collecting and utilizing information obtained by the clients 10a to 10e.

Further, in this embodiment, the process of obtaining AP lists can be executed simply by installing a predetermined program in computers normally used as the clients 10a to 10e. Furthermore, illegal APs can be detected simply by installing a predetermined program in the controller 20 and registering regular APs in it. Therefore, with this embodiment, illegal APs can be easily and inexpensively detected.

In the above embodiment, instead of the controller 20, any of the clients 10a to 10e may be provided with the functions of the controller 20. In this case, the program introduced into the controller 20 may be installed in any of the clients 10a to 10e. The regular AP lists registered in the HDDs 13 of the clients 10a to 10e are stored so that the clients 10a to 10e can detect illegal APs.

Further, in the above embodiment, the clients 10a to 10e automatically dispatches their AP lists to the controller 20. However, this embodiment is not limited to this aspect. For example, the controller 20 may obtain the AP lists by accessing the clients 10a to 10e to requests the lists from them. In this case, the AP lists detected by the clients 10a to 10e can be periodically obtained but may be arbitrarily obtained as desired by the system administrator, for example, twice or three times a day.

Furthermore, in the above embodiment, the time interval that determines the timing with which the clients 10a to 10e obtain AP lists is the standby time (t). Further, the time interval that determines the timing with which the controller 20 compares the AP lists received by the clients 10a to 10e is the standby time (t). However, this embodiment is not limited to this aspect. For example, if the clients 10a to 10e are frequently moved, they frequently searches for APs to which they can connect more easily, i.e. the clients 10a to 10e frequently obtain AP lists. In contrast, the AP lists may not be frequently dispatched to the controller 20 but may be dispatched, for example, every several hours. Even if the AP lists are frequently dispatched, the number of times that illegal APs are detected can be controlled by setting a longer standby time (t) for the controller 20.

Further, in this embodiment, detected illegal APs are located and removed. This embodiment is not limited to this aspect. For example, an illegal AP may be inhibited from transmitting or receiving data upon attempting to operate a router connected to it. Alternatively, only the warning indicating that an illegal AP is present may be issued, with the location of the illegal AP detected by equipment other than the controller 20.

In the above embodiment, the process is executed by the clients 10a to 10e and the controller 20 on the basis of the introduced program. However, this embodiment is not limited to this aspect. For example, instead of introducing the program, wireless connection devices (PC cards or boards for a wireless LAN) connected to the clients 10a to 10e may be provided with a function of periodically transmitting an AP list obtained to the controller 20. In this case, simply by connecting the wireless communication devices to the clients 10a to 10e, the clients 10a to 10e can detect illegal APs. Alternatively, the device connected to the network may be provided with the functions of the controller 20.

The program used to execute the process shown in this embodiment can take the form of a storage medium or a program transmitting apparatus as shown below. That is, a program executed by a computer may be stored in a storage medium such as a CD-ROM, a DVD, a memory, or a hard disk so as to be readable by the computer. Further, the program transmitting apparatus may comprise storage means such as a CD-ROM, a DVD, a memory, a hard disk, which stores the above program and transmitting means for reading the program from the storage means and transmitting the program via a connector or a network such as the Internet or a LAN to an apparatus which executes this program.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
a client that establishes a wireless connection to a network through an access point; and
a controller that receives data dispatched by said client, through said network,
wherein said client scans electromagnetic waves within bands used for wireless communication, and dispatches to said controller first identification information on access points detected as a result of the scan, and said controller stores second identification information on access points permitted to access said network, and on the basis of the second identification information and said first identification information, extracts non-registered access points that are not registered as said permitted access points.

2. The apparatus according to claim 1, wherein said client dispatches to said controller third identification information on access points not used for said wireless connection.

3. The apparatus according to claim 1, wherein said client dispatches to said controller intensities of signals received from said access points and, on the basis of said intensities, said controller estimates areas in which said non-registered access points are installed.

4. The apparatus according to claim 1, wherein the apparatus is a computer network security system, the client is a desktop computer, a laptop computer, or a handheld computer, and the network is a computer network.

5. The apparatus according to claim 1, wherein at least one of the access points is a wireless base station connected to a computer network.

6. A computer that transmits and receives data via a network to and from a client wirelessly connected to the network via an access point, the computer comprising:
- a storage section storing a permission list of permitted access points permitted to access said network;
- a collecting section that collects a recognition list of recognized access points recognized by said client scanning electromagnetic waves within bands permitted to be used for wireless communication; and
- an extracting section that extracts those non-registered access points of said recognized access points included in said recognition list which are not included in said permission list on the basis of the permission list and the recognition list.

7. The computer according to claim 6, further comprising:
- an installed position information storage section that stores installed position information on said permitted access points in said network;
- a signal collecting section that collects the intensities of signals generated by said recognized access points; and
- a calculating section that calculates positions at which said non-registered access points are installed, on the basis of said intensities and said installed position information.

* * * * *

UNITED STATES PATENT AND TRADEMARK OFFICE
CERTIFICATE OF CORRECTION

PATENT NO. : 7,639,640 B2  Page 1 of 1
APPLICATION NO. : 10/248116
DATED : December 29, 2009
INVENTOR(S) : Fujii et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2132 days.

Signed and Sealed this

Twenty-first Day of December, 2010

David J. Kappos
*Director of the United States Patent and Trademark Office*